Feb. 26, 1935.  J. T. LANDGRAF  1,992,377
THERMOSTATIC OIL CONTROL VALVE
Filed Nov. 1, 1933  2 Sheets-Sheet 1
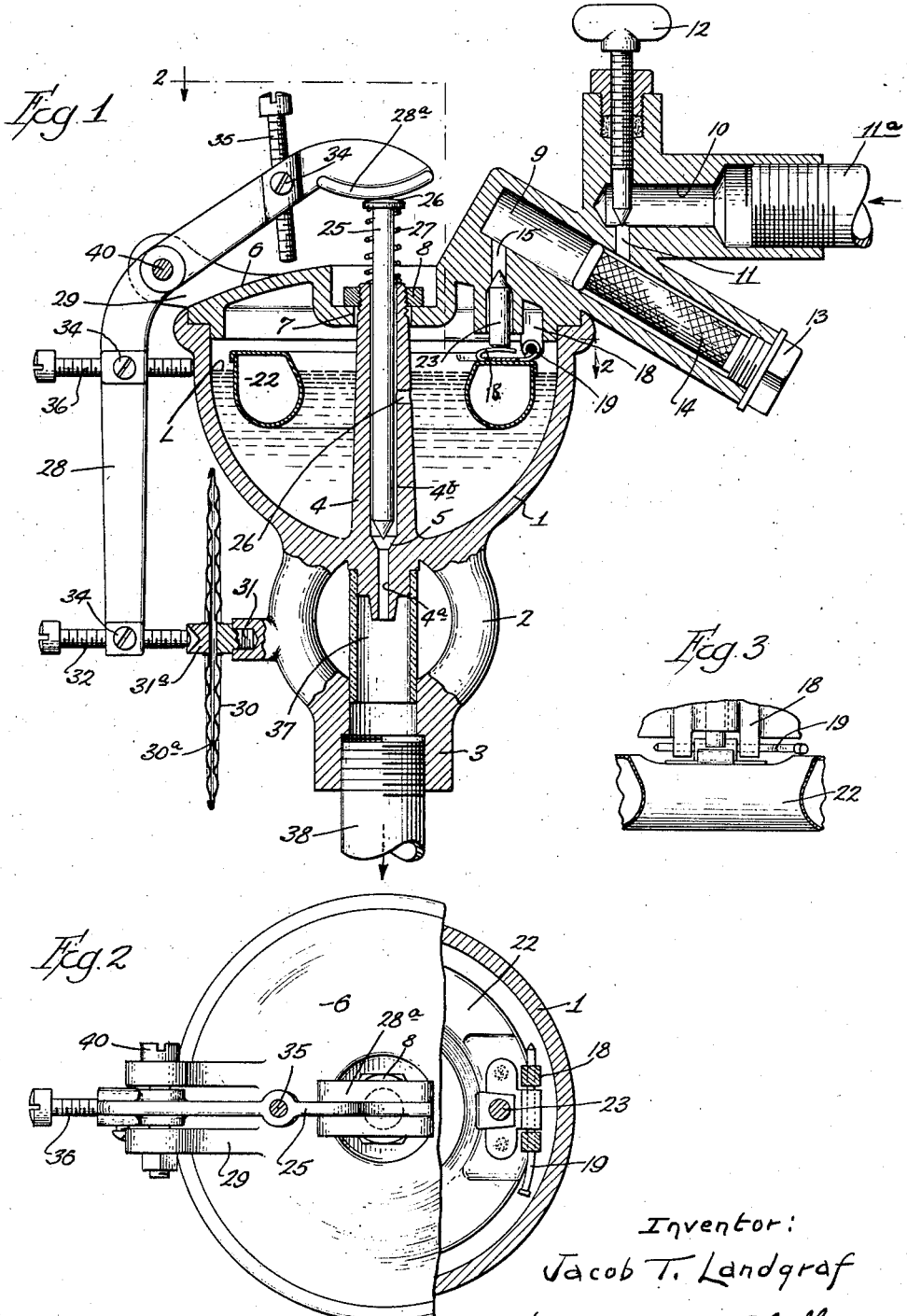
Inventor:
Jacob T. Landgraf
by Albert Scheible
Attorney

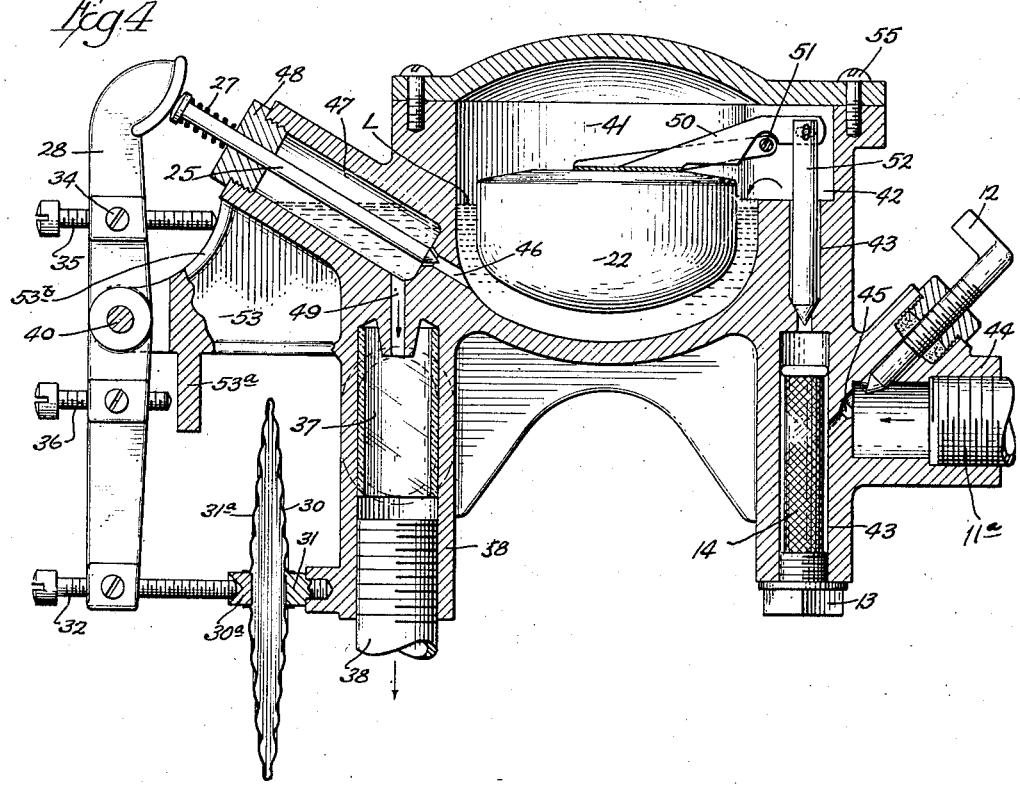

Patented Feb. 26, 1935

1,992,377

UNITED STATES PATENT OFFICE 1,992,377

THERMOSTATIC OIL-CONTROL VALVE

Jacob T. Landgraf, Rockford, Ill.

Application November 1, 1933, Serial No. 696,217

12 Claims. (Cl. 236—6)

My invention relates to a thermally actuable control valve for supplying oil or other liquid fuel to a burner, and in one of its general objects aims to provide a valve of this class having a sight-feed tube through which the oil descends in drops which the user can count to ascertain the rate at which oil is supplied to the burner, and in which the rate of the oil-feeding will not be affected by variations in the head or pressure at which oil is supplied to the valve.

Furthermore, my invention aims to provide a thermostatic constant-pressure sight-feed valve which can readily be adjusted with a high degree of sensitiveness for both maximum and minimum rates of oil-feeding, and also according to the rate of expansibility of the thermostatic wafer employed in connection with it, which will strain sediment out of the oil before the latter enters the main portions of the valve, and which will permit a ready cleaning of all parts without disturbing the adjustments.

In addition, my invention aims to provide a simple and inexpensive construction for a valve of the above recited characteristics and one which will permit all parts to be readily cleaned when necessary.

In its immediate commercial application my here presented valve is particularly suited for use in connection with brooders of the type in which oil is supplied to an oil burner (under the hood or canopy of the brooder) from a stationary oil tank disposed outside this hood and at higher elevation than the burner. In practice, the bottom of the tank usually is disposed at only in slightly higher elevation than the top of the oil chamber in the burner, so as to reduce the length of the piping and facilitate the refilling of the oil tank.

When a thermostatic control valve is interposed in the oil-supply pipe leading from the oil tank to the burner, the head or pressure at which the oil flows through the valve necessarily varies with the level of oil in the said tank.

Consequently, the drop in the oil level from that in a full tank to a nearly empty tank produces such a relatively large change, in proportion to the elevation of the oil valve with respect to the level at which oil is to be maintained in the burner, as to cause wide variations in the said oil level at the burner. Consequently, a control valve of the types now generally used will still permit the temperature under the canopy of the brooder to fluctuate to an undesirable extent, so that temperature variations of five degrees or more frequently occur under the canopies of oil-burning brooders when the oil supply is controlled by the thermostatic valves now commonly in use.

My present invention aims to provide a thermostatic control valve in which the oil is fed through the sight-feed tube under a substantially constant head regardless of the pressure at which oil is supplied to the valve, and which valve can readily be adjusted so that the temperature under the brooder canopy will vary only to an immaterial degree, even when the oil level in the tank drops from the top to the bottom of the latter.

Still further and also more detailed objects will appear from the following specification and from the accompanying drawings showing two embodiments of my invention.

In the drawings,

Fig. 1 is a central, vertical and longitudinal section through a valve constructed according to my invention, in which the float is pivoted to the cover of the valve body so as to be detachable from the body along with the cover, showing the metering plunger and the lever associated with this plunger as they appear when the thermostatic wafer is cold and the said plunger allows the maximum flow of oil permitted by the adjustments.

Fig. 2 is a fragmentary horizontal section taken along the line 2—2 of Fig. 1.

Fig. 3 is a fragmentary side elevation of the right-hand portion of the float of Fig. 1, the adjacent part of the cover, and the means pivotally connecting these portions.

Fig. 4 is a central, vertical and longitudinal section through another embodiment of my invention, in which the constant-pressure-determining float is pivoted to the valve body, while the cover is arranged so that it can be swung away from the mouth of the oil bowl or float chamber, showing the thermostatic wafer expanded and the metering plunger disposed for allowing the minimum oil flow permitted by the adjustments.

Fig. 5 is a plan view of the same embodiment.

Fig. 6 is an elevation of a portion of the same valve, showing the sight-feed.

In the embodiment of Figs. 1 and 2, the control valve of my invention has as its body member an oil bowl 1 having two legs 2 depending from the bottom of the bowl connected at their lower ends by an outlet nipple 3. Rising centrally from the bowl bottom is an upright tube 4 which has the lower or discharge portion 4a of its bore of smaller diameter than the upper portion 4b of that bore, thereby affording an upwardly flaring annular seat 5 at the juncture of the two bore portions.

Detachably fitted to the mouth end of the oil bowl 1 is a cover 6 having a central perforation 7 through which the upper end of the riser tube 4 freely extends, this tube-end portion being threaded to fit a nut 8 which normally clamps the cover to the bowl to seal the bowl against the entrance of dust. The cover also has an integral portion thereof formed to afford a strainer bore 9 which slopes downwardly outward of the cover, and another portion formed to afford a lateral inlet bore 10 to which the oil-supply pipe 11 is connected.

Leading downwardly from the inlet bore 10 to a part of the strainer bore 9 intermediate the ends of the latter is a port 11 controlled by a cock 12. Threaded into the outer end of the inclined strainer bore 9 is a plug 13 carrying a strainer or filter which may be a tube 14 loosely filled with felt or the like, and which filter extends beyond the port 11 part way towards a bowl-inlet port 15 leading downwardly from the strainer bore 9 through the cover. This second port has its lower portion enlarged in diameter to afford a downwardly flaring annular seat 16 at the juncture of the two bore portions.

Adjacent to the said bowl-inlet port 15 and farther from the axis of the bowl are two lugs 19 through which a horizontal pin 20 extends. Swiveled upon this pin is a bracket 21 fastened to the top of a hollow flat 22 near the periphery of the latter, which bracket is here shown as having its inner end portion recurved to dispose a bracket portion 21a in alinement with the said second (or bowl-inlet) port 15. Extending freely into the lower (enlarged) portion 15a of the just named port and seated at its lower end on the said swiveling bracket is a movable valve member 23 which has at its upper end a tapering tip adapted to seat on the downwardly flaring annular seat 24 at the juncture of the two differently diametered portions 15 and 15a of the bowl-inlet port when the valve member 23 is sufficiently raised by an upward swinging of the float, the length of the valve member 23 being such that this seating occurs when the float is horizontal and when the level L of oil in the bowl 1 is below the mouth of the cover.

Extending downwardly into the upper and main portion of the bore of the riser tube 4 is a metering pin 25 which is sufficiently smaller in diameter than the said tube bore portion to permit a ready downward flow of oil admitted to this tube from the bowl through a lateral port 46, which port is at lower elevation than the said level L, but considerably above the bottom of the bowl. This metering pin has a tapering lower end adapted to seat on the seat 5 within the riser tube, and the metering pin projects considerably above the upper end of the riser tube and has a head 26 at its upper end. Interposed between this head of the metering pin and the upper end of the riser tube 4 is a compression spring 27 which continually urges the said pin upwardly and hence tends to raise the lower end of the pin off the seat 5.

Extending alongside the bowl 1 and overhanging the cover 6, desirably at the opposite side of the bowl from the strainer tube and the shut-off cock 12, is a lever 28 of the first class which is pivoted on a horizontal axis to a bracket 29, here shown as an integral part of the cover. This lever has its upper end 28a overhanging the head 26 of the valve plunger and its lower end extending alongside (but spaced from) one of the legs 2 which support the bowl 1 from the outlet nipple 3.

Supported by the leg 2 which is adjacent to the lever is a thermally expansible member, such as a thermostatic wafer containing a small quantity of sulphuric ether, having each wafer wall fastened to an axial stem. For this purpose, the stem 31 on one wafer wall 30 is threaded into the adjacent leg 2 (as shown in Fig. 1) with its axis preferably in the same plane with the axes of both of the legs 2 and also in the general plane in which the lever 28 swings, while the companion wafer wall 30a carries an axial stem 31a projecting towards the lower arm of the lever.

Threaded through this lower lever arm is a thrust screw 32 having its tip adapted to socket in the concaved outer end of the wafer stem 31a to prevent the screw from slipping off that stem in case they do not exactly aline. This thrust screw is normally locked in its adjusted position by a lock-screw 34 and similar lock-screws are likewise associated with each of two stop screws 35 and 36 which respectively define the minimum and the maximum oil discharge opening to be afforded between the lower-end tip of the metering pin 25 and the seat 5 facing that tip.

In addition, I support an upright glass sight-feed tube 37 between the depending legs 2 of the oil bowl in alinement with the discharge port 4a of the bowl.

When used in connection with a brooder, my valve may be conveniently supported by screwing its bottom nipple 3 upon the upper end of a pipe 38 leading to the burner, while the oil-supply pipe 11a leads from an oil tank at higher elevation than the inlet nipple 10 to which the latter pipe is connected.

When the valve has thus been installed with the oil bowl 1 empty and desirably with the outward wall 31a of the thermostatic wafer facing the burner and with the inlet cock 12 closed, the float will be swung downwardly from the position of Fig. 1 so that the valve member 23 will allow oil to flow freely past it. As soon as the valve cock 12 is opened, the bowl fills rapidly until the float raises the said member to its illustrated closure position, and oil flows past the metering pin 25 through the sight-feed tube 37. The needed three adjustments can then be conveniently made as follows, after loosening the three set-screws 34:

First, the upper adjusting screw is screwed down into engagement with the cover 6 and adjusted until oil drops through the sight-feed tube 37 at the maximum rate required for the burner, as for example about 225 drops per minute, and latch this screw by the adjacent set-screw 34.

Then, the intermediate adjusting screw 36 is screwed up against the bowl 1 and turned to rock the lever until the rate of oil drops is reduced to the minimum required by the burner for maintaining the flame, as for example about 50 drops per minute, this screw 36 being locked by the set-screw 34 adjacent to it.

And last, the lowest adjusting screw 32 is turned until its tip is only slightly spaced from the end-socket in the wafer stem 31a which faces this tip, and likewise locked in its adjusted position.

When the three adjusting screws are thus positioned (as also shown in Fig. 1), the upper (or minimum-flow controlling) screw 35 will be raised off the cover 6 by the metering pin 25 which is urged upwardly against the upper lever arm until the intermediate (maximum-flow controlling) screw 36 bears against a side of the bowl. With the burner then lit, the radiation of heat (either direct from the burner or from under the canopy of the brooder) gradually warms the thermostatic wafer to expand the latter, and as soon as the expansion suffices for having the outer wafer stem 31a engage the thermostat-adjusting screw 32, the wafer begins to rock the lever 28 (in a counter-clockwise direction in Fig. 1 about its pivot pin 40) so that the upper lever arm depresses the metering pin 25 and gradually reduces the discharge flow between the tip of this pin and the seat 5.

This throttling movement of the metering pin will vary back and forth with variations in the temperature of the wafer, but the metering can only move downwardly to the extent limited by the engagement of the upper adjusting screw 35 with the cover 6, while the upward or discharge-enlarging movement of the metering pin is likewise limited by the engagement of the intermediate adjusting screw 36. With the float 22 and the length of the inlet valve member 23 suitably proportioned, this float then will move up and down to control the supply of oil to the bowl 1 so as to maintain the oil in the bowl at a substantially constant level, thereby insuring a uniform feeding of the oil (with any given position of the inlet-control plunger 23) regardless of variations in the head or pressure at which oil enters through the supply pipe. As the result, my control valve has been found in practice to maintain the temperature under a brooder canopy within a variation of only half of a degree Fahrenheit.

Moreover, since the actual rate of oil-feeding can quickly be checked by counting the drops which descend through the sight-feed tube 37, each of the upper two adjusting screws 35 and 36 can speedily be readjusted if either the maximum or the minimum adjustment is not quite suited to the operating conditions; and the thermostat-controlling screw 32 likewise can be readjusted if the wafer does not respond just as expected or when replacing the wafer with one which is not an exact counterpart of the former one.

Furthermore, with a bolt employed for the pivot pin 40 of the lever, this bolt can readily be withdrawn without changing the positions of the three adjusted screws with respect to the lever; and when the nut 8 is then detached, the cover 6 together with the float and all other parts carried by this cover can instantly be detached for cleaning the bowl. Likewise, the filter or strainer 14 can quickly be detached (by unscrewing the plug 13 which carries it) for cleaning or even replacing the filter, so that all parts of control valve can easily be cleaned without disturbing the previously made adjustments.

However, while I have heretofore described my constant-pressure thermostatic control valve in connection with an embodiment in which the float is pivoted to the cover and in which both the strainer housing and the inlet nipple are integral with the cover, my valve may also be of a type in which the strainer housing is a part of the body member and has the float pivoted to it, while the cover functions only as a closure for the bowl and can readily be detached from the body member without detaching the lever which controls the position of the metering pin.

Thus, Figs. 4 to 6 show an embodiment in which the body member has its upper portion formed to afford a bowl 41 normally closed by a simple cover 6, and in which the upper portion of the bowl has an extension 42 from which a bore 43 leads downward into an upright strainer chamber 43 to which the inlet nipple 44 is connected (below the upper end of the strainer) by a port 45 controlled by a cock 12. The outlet from the bowl is a port 46 which leads from near the bottom interior of the bowl to a bore 47 which slopes upwardly outward and which has its outer end closed by a head 48 through which the metering pin 25 slidably extends. A second port 49 in the burner bowl casting leads downwardly from the said bore 47 and opens directly into the bore of a glass sight-feed tube 37 supported within a part of a depending tube 48 to which the outlet pipe 38 is attached, which tube part has lateral openings 49 permitting a view through the sight tube.

The float 22 in this embodiment is supported by the inner arm of a lever-type bracket 50 which is pivoted intermediate its ends on a pivot pin 51 extending across the bowl extension 42, while the valve member 52 which controls the admission of oil from the strainer housing 43 to the bowl depends from the shorter arm of the said lever-like bracket. The depending tube 58 also supports the thermostatic wafer, and the lever 28 is pivoted on a bolt extending through a laterally projecting bracket 53, which bracket has two portions 53a and 53b respectively disposed for engagement by the minimum-feed adjusting screw 35 and the maximum-feed adjusting screw 36.

When the three screws 35, 36 and 32 have been adjusted in the same manner as in the embodiment of Fig. 1, the metering pin 25 always has its tip freely spaced from the outlet end of the port 46, and the bore 47 through which this plunger extends is also filled with oil at the same maintained level L with that in the bowl, thereby insuring the same constant pressure as in the previously described embodiment. So also, the float-pivoting means affords a considerable leverage which makes the inlet-control valve sensitively responsive to up and down movements of the float, although the float-supporting bracket 50 in Fig. 4 is a lever of the first class while the bracket 18 of Figs. 1 to 3 was a lever of the second class.

Comparing the two illustrated embodiments, the one shown in Figs. 4 to 6 has the advantages over that of Fig. 1 that the cover can be detached without detaching or loosening any parts except the cover-clamping screws 55; also that the plunger-housing bore 47 (which does not serve as a guide for a metering pin) can be of much larger diameter than the metering pin 25.

However, still other changes might obviously be made as to the construction and arrangement of my here presented valve without departing either from the spirit of my invention or from the appended claims, hence I do not wish to be limited to the here illustrated embodiments. So also, I do not wish to be limited to the conjoint use of all novel features of my invention, it being obvious for example that the triple adjustable thermostatic control of the oil dropping through the sight-feed tube of either of my illustrated types regardless of the manner in which the oil within the upright bore 4b of Fig. 1 or the inclined bore 47 of Fig. 4 is maintained at a constant level.

I claim as my invention:

1. A liquid-flow control valve of the class described, comprising a liquid receptacle having an outlet bore through which liquid discharges downwardly; a supply pipe leading to the receptacle; float-actuated means for maintaining the level of liquid in the receptacle at a constant height above the inlet of the outlet bore; a metering member movable for controlling the discharge of liquid from the outlet bore, and thermally responsive means controlling the position of the metering member; the thermally responsive means including a lever operating the metering member, and two separate means for restricting the movement of the lever to positions corresponding respectively to maximum and minimum outlet-opening positions of the said member.

2. A liquid-flow control valve of the class described, comprising a liquid receptacle having an outlet bore through which liquid discharges downwardly; a supply pipe leading to the receptacle; float-actuated means for maintaining the level of liquid in the receptacle at a constant height above the inlet of the outlet bore; a metering member movable for controlling the discharge of liquid from the outlet bore, and thermally responsive means controlling the position of the metering member; the thermally responsive means including a lever operating the metering member, and two separate means for restricting the movement of the lever to positions corresponding respectively to maximum and minimum outlet-opening positions of the said member, and independent means associated with the lever for adjusting the initial response of the thermally responsive means to a rise in temperature.

3. In a thermostatic valve, a hollow valve body having an inlet and an outlet, a metering pin controlling the outlet, a spring continually urging the metering pin away from the said outlet, a lever pivoted intermediate its ends to the said body and having one lever arm disposed for moving toward the outlet when the lever rocks in one direction, a thermostatic member interposed between the valve body and the other end of the lever for rocking the lever in the said direction upon response of the said member to a rise in temperature, and two independently adjustable stop means interposed between the lever and the valve body for limiting the rocking of the lever in respectively opposite directions.

4. A thermostatic valve as per claim 3, in which the two stop means are respectively associated with the two arms of the lever.

5. A thermostatic valve as per claim 3, in which the two stop means are screws threaded respectively through the two arms of the lever, each screw having one end thereof disposed for engaging the valve body to halt the rocking of the lever in one direction.

6. A thermostatic valve as per claim 3, in which the two stop means are screws threaded respectively through the two arms of the lever, each screw having one end thereof disposed for engaging the valve body to halt the rocking of the lever in one direction, one of the said screws being disposed between the pivot axis of the lever and the lever end associated with the thermostatic member.

7. A constant-pressure thermostatic valve for controlling the supply of liquid to a pipe, comprising a hollow body member having a downward outlet, a sight-feed glass tube through which the liquid is discharged from the said outlet, means for supplying liquid to the interior of the body member and for maintaining the liquid within the said interior at a constant level, a valve member controlling the flow of liquid through the said outlet; a lever pivoted upon the body member and having one arm thereof disposed for controlling the position of the said valve member; and a thermally responsive member interposed between the body member and the other arm of the lever.

8. A valve as per claim 7, including two independently adjustable stop means operatively interposed respectively between the two arms of the lever and the body member for limiting the movement of the lever in respectively opposite directions.

9. A valve as per claim 7, including two adjusting screws respectively threaded through the two arms of the lever, each of the said screws having one end thereof adapted to engage the body member, the said screws serving to limit the swinging of the lever in respectively opposite directions.

10. A valve as per claim 7, including an adjusting screw threaded through one arm of the lever and having its tip disposed for engaging the thermally responsive member when the lever is swung in the direction in which the corresponding movement of the said valve member increases the flow of liquid through the outlet, the thermally responsive member being out of contact with the said screw tip when that member is cold.

11. A valve as per claim 7, in which the body member is formed to afford a bowl-shaped oil-storing chamber and has a lateral extension of the said chamber, the body member also having an inlet bore leading upwardly to the said chamber extension; and in which the constant-level maintaining means comprise a lever pivoted on an axis extending across the said chamber extension, a valve member depending from one arm of the lever and extending into the inlet bore and controlling the admission of liquid through the said bore, and a float associated with the other arm of the liquid and buoyed up by liquid in the said chamber.

12. A liquid-flow control valve as per claim 7, in which the liquid receptacle comprises a body member formed to afford a bowl-shaped oil-storing chamber and has a lateral extension of the said chamber, the body member also having an inlet bore leading upwardly to the said chamber extension, the said bore having an enlarged lower portion and also having between the latter portion and the upper bore portion a diametrically contracted portion underhanging the said valve member; and including a strainer housed by the said lower bore portion and through which the supplied liquid flows upwardly toward the said diametrically contracted bore portion.

JACOB T. LANDGRAF.